3,558,577
TEMPERATURE CONTROL OF VINYL ESTER POLYMERIZATION IN AN AQUEOUS EMULSION
Raymond N. Fleck, West Covina, and Donald C. Young, Fullerton, Calif., assignors to Union Oil Company of California, Los Angeles, Calif., a corporation of California
No Drawing. Filed June 25, 1968, Ser. No. 739,669
Int. Cl. C08f *15/24, 1/13*
U.S. Cl. 260—87.1
9 Claims

ABSTRACT OF THE DISCLOSURE

Temperature control of aqueous emulsion copolymerization of vinyl esters is achieved by refluxing liquids such as ethane, propane and Freons from the reaction mixture and applying external cooling. The liquid may be bled or vented from the system if reaction conditions warrant.

---

This invention relates to a new and improved process for the copolymerization of vinyl esters with gaseous monomers and, more specifically, to a process for removing heat from the reaction system in the copolymerization of vinyl acetate and ethylene.

The aqueous emulsion copolymerization of vinyl acetate with a gaseous monomer is usually carried out in stirred reactors using free radical or redox catalysts, at pressures ranging from about 100–1500 p.s.i. and at temperatures from about 95°–160° F. Usually, an initial charge of ingredients is first added to the reactor and once the reaction has commenced, further additions of monomers, catalyst, water, emulsions, etc. are then added either intermittently or continuously. Co-pending application 671,934 to Ralph H. Bauer and P. Stanley Backlund sets forth various reaction conditions, catalysts, surfactant systems, etc. The emulsions may be employed in paints, adhesives, etc.

For optimum results, and to maintain product uniformity, the temperature must be kept under close control, a deviation of about ±5° C. being considered acceptable. One method of achieving temperature control is by varying the input rate of either one or more of the ingredients, such as monomers, catalyst, water, emulsion, etc. Another way to achieve temperature control is by applying heating or cooling through coils surrounding the reactor.

However, neither method of temperature control is completely satisfactory. Varying the input rate of the ingredients generally takes too long to achieve effective temperature control, while use of heating and cooling coils is limited by the physical size of the reactor itself.

As a reactor is scaled up, it becomes increasingly difficult to obtain sufficient cooling. The following tabulation shows the time required to remove the total heat from three reactors, assuming that the heat is uniformly generated and removed. The heat generated is assumed to be 21.3 Kcal./mole for the copolymerization of vinyl acetate and ethylene.

| Capacity of reactor, gallons | Time for heat removal under uniform load, hours |
|---|---|
| 0.25 [1] | 0.21 |
| 25 [2] | 0.71 |
| 1000 [2] | 4.3 |

[1] Using internal cooling coil.
[2] Using cooling jacket around a stirred reactor.

Since 1,000 gallons is the size of reactor usually employed for commercial operations, a time of 4.3 hours for heat removal is economically unsound.

When using cooling coils it is simplest to employ a fixed amount of coolant when the cooling system is actuated. This is unsatisfactory because then the cooling response is the same irregardless of whether the reaction temperature approaches the upper limit slowly or whether the approach is very sharp. If the reaction temperature is rising slowly at the time cooling is applied, a sharp temperature drop will occur. This in turn will necessitate altering the reaction conditions to compensate for this sharp temperature drop. However, if batch-to-batch uniformity is to be maintained, reaction conditions should be the same at corresponding times in the polymerization. The amount of coolant employed could be varied in response to temperature changes, but since temperature distribution is not uniform in a large size reactor, the installation and testing-out of additional temperature controls and associated instrumentation would be necessary, and this is impractical.

It is, therefore, an object of the invention to provide a method of controlling the reaction temperature in the copolymerization of vinyl esters with gaseous monomers. Another object is to provide a method for controlling the reaction temperature in the copolymerization of vinyl acetate and ethylene.

Another object is to maintain a uniform temperature control in the copolymerization of vinyl acetate and ethylene using an inert liquid which is vaporized from the reaction mixture and externally cooled. Further objects of the invention will become apparent from the description to follow.

The objects of the invention are attained in the aqueous emulsion copolymerization of a vinyl ester and a gaseous monomer by carrying out the reaction at a temperature of about 95°–160° F., at pressures of about 100–1500 p.s.i., mixing an immiscible liquid with the reaction mixture, vaporizing the liquid, cooling it externally of the reaction mixture and returning the cooled liquid to the reaction mixture, the liquid being relatively inert with respect to the reactants.

Various liquids may be employed and include ethane, propane, isobutane, butane, pentanes, the Freons such as chlorodifluoromethane, other low boiling point fluorinated alkanes such as 1,1-difluoroethane, etc. and mixtures of these. When copolymerizing vinyl acetate and ethylene, propane is the preferred liquid.

The vapor pressure of the liquid must be such that it can be caporized under the conditions of the reaction temperature and pressure. Also, the liquid must be relatively inert with respect to the ingredients and must have a sufficiently high thermal capacity to permit an adequate heat exchange. Preferably there should be a minimal or no azeotrope formation of the liquid with the gaseous polymerizable monomer.

About 10–30 percent by volume of liquid based on the total volume of reaction mixture has been found effective in dissipating heat from the reaction by external cooling. A preferred concentration is about 15–20 percent by volume of liquid based on the total volume of reaction mixture.

During the reaction, if the pressure buildup becomes too great, the Freons, propane or other liquid may be bled from the reactor and vented, if necessary, or compressed and pumped back into the system when warranted by subsequent reaction conditions. At the conclusion of the reaction, and preferably before depressurizing, the liquid is separated, by bleeding or venting, from the copolymer latex with which it is essentially immiscible.

If necessary or deisrable, additional temperature controls can be applied by means of cooling coils, and varying the input rate of either one of monomers, catalysts, water, emulsion, etc.

In addition to functioning as heat dissipators, ethane, propane, isobutane and the pentanes appear to function as chain transfer agents in the vinyl acetate-ethylene copolymerization reaction. This results in a decrease of side chain branching in the polymer which in turn increases the density of the copolymer and results in a stiffer material.

When employing vinyl acetate and ethylene as the copolymerizable monomers, the reaction is best carried out at about 400–600 p.s.i., and 130° F.–155° F. The lower temperature limit is determined by a commercially acceptable reaction time; the upper limit is determined by the susceptibility of the surfactant to degradation.

Other copolymerizable gaseous monomers which may be employed with or in place of ethylene include chloro and fluorosubstituted ethylenes such as tetrafluoroethylene, vinyl chloride, vinylidene chloride, vinyl fluoride, chlorotrifluoroethylene, etc.

Copolymerizable liquid monomers which may be employed in the copolymerization with the vinyl ester and the gaseous monomer include butyl acrylate, 2-ethylhexyl acrylate, acrylic acid, dioctyl fumarate, dioctyl maleate, dibutyl fumarate and dibutyl maleate.

Accordingly, it will be seen that use of the inert liquid enables both a temperature and pressure control to be exerted on the reaction system. Also, use of ethane, propane, isobutane, butane and the pentanes causes a chain transfer effect in the polymerization and results in a latex having improved film properties. Finally, since the reaction is much more uniform, it is far easier to control. This means fewer operators are required and batch-to-batch uniformity of the emulsion can be maintained.

We claim:

1. In the copolymerization of vinyl esters with a gaseous copolymerizable monomer in an aqueous emulsion at a temperature of 95°–160° F. and under a pressure of about 100–1500 p.s.i., the improvement by which the temperature is controlled during the reaction consisting essentially of mixing an inert and immiscible liquid that is volatilizable at said temperature and pressure with the aqueous emulsion, vaporizing the liquid during the polymerization, cooling the resulting vapors externally of the reaction mixture to condense said liquid, and returning the cooled, liquid condensate to the reaction.

2. The method of claim 1 in which the vinyl ester is vinyl acetate.

3. The method of claim 2 in which the gaseous monomer is ethylene.

4. The method of claim 1 in which the liquid is selected from the class consisting of: ethane, propane, isobutane, butane, and pentanes.

5. The method of claim 1 in which the liquid is employed in quantities varying from 10–30% of the total reaction volume.

6. The method of claim 1 in which the gaseous polymerizable monomer is selected from the class consisting of: tetrafluoroethylene, vinyl chloride, vinylidene chloride, vinyl fluoride, and chlorotrifluoroethylene.

7. The process of claim 1 in which the liquid is removed from the reaction system prior to depressurizing the reactants.

8. The method of claim 1 in which the liquid is propane.

9. The method of claim 1 in which about 15–20% by volume of liquid is employed based on the total volume of reaction mixture.

References Cited

UNITED STATES PATENTS

| 2,484,384 | 10/1949 | Levine | 260—93.7 |
| 3,053,820 | 9/1962 | Wechsler | 260—87.1 |

FOREIGN PATENTS

| 1,330,140 | 5/1963 | France | 260—92.8W |
| 1,385,374 | 12/1964 | France | 260—92.8W |
| 492,682 | 5/1953 | Canada | 260—95 |

JOSEPH L. SCHOFER, Primary Examiner

C. A. HENDERSON, Jr., Assistant Examiner

U.S. Cl. X.R.

260—78.5, 80, 80.8, 80.81, 87.3, 95